United States Patent [19]

Bruml et al.

[11] Patent Number: 4,835,388
[45] Date of Patent: May 30, 1989

[54] THERMOLUMINESCENCE DOSIMETRY CARD READER HEATING ASSEMBLY

[75] Inventors: William Bruml, Cleveland Hts.; Marko Moscovitch, Euclid; Andras Szalanczy, Elyria, all of Ohio

[73] Assignee: The Harshaw Chemical Company, Edison, N.J.

[21] Appl. No.: 35,439

[22] Filed: Apr. 7, 1987

[51] Int. Cl.[4] .................................................. G01T 1/115
[52] U.S. Cl. ................................................... 250/337
[58] Field of Search .................. 250/337, 484.1 A, 328

[56] References Cited

U.S. PATENT DOCUMENTS

| | | | |
|---|---|---|---|
| 3,229,097 | 1/1966 | Durkee et al. | 250/484.1 |
| 3,282,855 | 11/1966 | Palmer et al. | 250/484.1 |
| 3,283,150 | 11/1966 | Schayes | 250/484.1 |
| 3,300,643 | 1/1967 | McCall . | |
| 3,484,610 | 12/1969 | Becker . | |
| 3,590,245 | 6/1971 | Oonishi et al. . | |
| 3,638,017 | 1/1972 | Jones et al. . | |
| 3,792,277 | 2/1974 | Yamashita | 250/337 |
| 4,091,284 | 5/1978 | Yamomoto et al. | 250/337 |
| 4,105,918 | 8/1978 | Miyagawa et al. | 250/484.1 |
| 4,546,259 | 10/1985 | Zendle | 250/337 |

FOREIGN PATENT DOCUMENTS

| | | | |
|---|---|---|---|
| 1243792 | 7/1967 | Fed. Rep. of Germany | 250/337 |
| 63078 | 6/1978 | Japan | 250/337 |

OTHER PUBLICATIONS

Petrock et al., Hot Nitrogen Gas For Heating Thermoluminescent Dosimeters, Second Int. Conf. on Luminescence Dosimetry, 652–669, 1968.
Oonishi et al., Dosimeter and Reader By Hot Air Jet, Third Int. Conf. on Luminescence Dosimetry, 237–248, Riso Report No. 249, Dec. 1971.
Alnor brochure, Thermoluminescent Dosimetry System Reader and Irradiator, undated.
Panasonic brochure, Thermoluminescence Dosimetry System (UD-512AA), undated.
Brochure, "Personal Safety", undated.
Better-Jensen, A Reader for the Measurement of Solid Thermoluminescence Dosimeters by Means of Hot Nitrogen gas, Danish Atomic Energy Commission, 1970.
Julius et al., A Versatile Automatic TLD System Under Development, Fourth Int. Conf. on Luminescence Dosimetry, Kraków, Poland 675–689, Aug. 1974.
Harshaw brochure, Atlas–Automated TL Analyzer System, 1982.
Alnor brochure, Thermoluminescent Dosimetry Results You Can Trust, undated.

Primary Examiner—Carolyn E. Fields
Attorney, Agent, or Firm—Renner, Otto, Boisselle & Sklar

[57] ABSTRACT

A thermoluminescence dosimetry (TLD) card reader includes at least one light detector for detecting light emitted by a heated thermoluminescent element and a heater for heating each TL element. The heater includes a conduit for channeling a flow of gas from a gas source and for discharging heated gas against a TL element, along with means for heating the conduit for transferring heat from it to the gas flowing through it. Preferably, the conduit is electrically conducting and an electrical current is passed through it via leads joined to the conduit near its inlet and outlet ends to heat the tube. A thermocouple disposed proximate the outlet end of the conduit for measuring the temperature of the gas being discharged from the tube, provides an electrical signal to a controllable electrical current source connected to the leads so that the temperature of the gas being discharged from the conduit may be controlled according to a prescribed relationship.

32 Claims, 5 Drawing Sheets

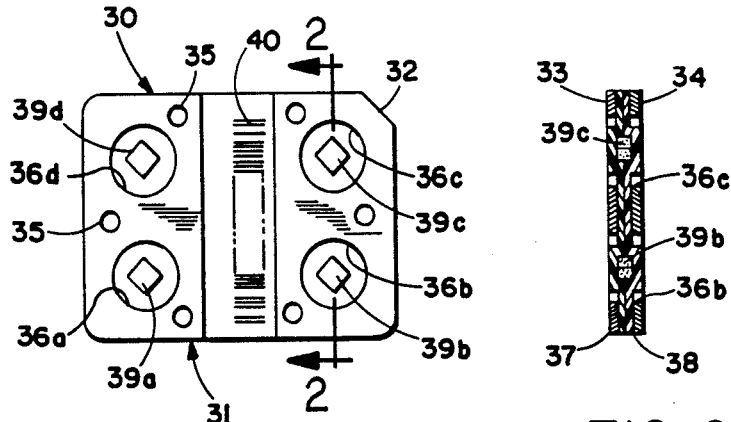
FIG. 1
FIG. 2
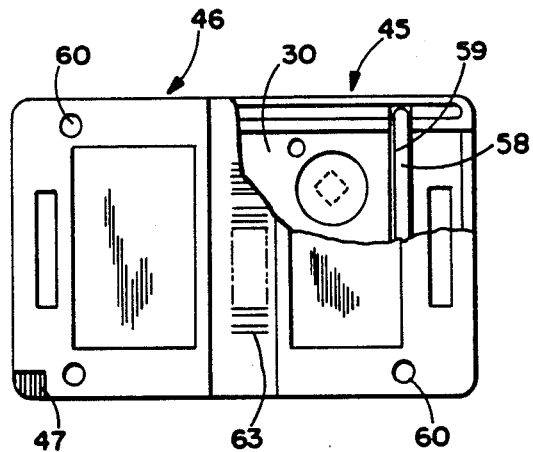
FIG. 3

THERMOLUMINESCENCE DOSIMETRY CARD READER HEATING ASSEMBLY

DISCLOSURE

The invention disclosed herein relates generally to heater assemblies for thermoluminescence dosimetry card readers.

BACKGROUND

Thermoluminescence dosimetry, commonly referred to as TLD, is a technique for radiation dose measurement. In certain known materials, an incident flux of charged particles, such as beta rays, or uncharged particles, such as neutrons, or of electromagnetic energy, such as gamma rays and X-rays, creates charge carriers that are stored in traps within the material. When the materials are heated over time, the trapped charges are gradually released and, when released, they recombine to produce light emissions. When the emitted light is measured as a function of the temperature of the material over time, a glow curve is produced. The glow curve can be analyzed to determine the quantity of a particular flux to which a thermoluminescent material has been exposed. Typical materials used in TLD are fluorides of lithium and calcium, independently and mixed with other elements or compounds. Different materials respond to different kinds of fluxes so that a variety of thermoluminescent dosimeters may be manufactured for various applications.

TLD systems have been developed for monitoring the exposure of personnel who work in the vicinity of radioactive materials, X-ray equipment and the like, to particle and electromagnetic fluxes. Each person being monitored is given a badge to wear that is exposed to the same type and dosage of radiation as is the person wearing the badge. Although different types of badges have been used, generally the badges consist of an outer holder that houses a TLD card insert usually containing two, three or four thermoluminescent (TL) elements. Commonly, the card insert contains a hole for each TL element. A TL element is disposed approximately in the center of each hole with a relatively inert plastic material. Fluoropolymers, especially polytetrafluoroethylene, are commonly used for mounting TL elements in card inserts. The TLD cards, and the holders as well, may be provided with a machine readable code to enable automatic card and/or holder identification by TLD card reader.

Periodically the TLD cards are processed through a TLD card reader to produce an exposure record for each person being monitored. In the TLD card reader, the TL elements in each card are heated and the thermoluminescence as a function of TL element temperature is measured, for example by a photomultiplier. The photomultiplier response is processed electronically to provide a measurement of TL integrals and/or the glow curve. After a glow curve is determined, the TL elements are heated to anneal them so that they can be used again. The annealing cycle may preferably include several increasing and decreasing temperature cycles to erase any memory of the previous exposures to particle and energy fluxes.

Various TLD card readers heat the TL elements in a variety of different ways. In one common technique, a reader places a "hot finger" in direct contact with each TL element in a card insert. The heat produced by heating a finger is transferred to a TL element. While this technique provides good control of TL element temperature over time, the plastic material holding each TL element in an insert is also heated by the hot finger and can yield in response to mechanical pressure at elevated temperatures. This direct contact can result in mechanical damage to an insert card, shortening its life. In addition, the finger emits infrared radiation that can produce glow curve errors when a TL element has received a relatively low dose of radiation. The fingers must be advanced and retracted in an automatic reader so that mechanical failures are possible.

TL elements may be optically heated, for example, by shining a beam of coherent light on each element. However, specially designed, small and thin TL elements are required to respond to a light beam. The reduced mass yields a smaller amount of light for a given radiation dosage compared to more conventional TL elements. The smaller light emission means the threshold of dose detectability suffers, i.e. increases, in these elements. Although the threshold can be lowered somewhat by special electronic signal processing techniques, extra cost is incurred in threshold sensitivity compensation. These TL elements are typically mounted on an absorber that efficiency absorbs the energy in the light beam. These absorbers and their substrates can produce unwanted radiation that may be detected by a photomultiplier and introduce errors in a glow curve measurement.

TL elements that have been bonded to a susceptor, such as a graphite body, may be heated by induction with radio frequency (RF) energy. Like the optically heated TL elements, heating rates and TL element temperature as a function of time is difficult to control in RF heated elements. Relatively large amounts of RF power are needed to heat TL elements to the desired temperature. Since the temperature-time relationship is essential to accurate analysis of a glow curve, and to TL element treatments before and after glow curve generation, inability to control that relationship is of critical importance.

A flow of a constant temperature heated gas over TL elements as a heat source is also known. A gas flow eliminates mechanical contact with a TL element and moving parts. However, with a constant temperature gas source, a relatively high gas temperature must be maintained to achieve the desired highest temperature. The temperature variation of the TL elements over time, therefore, is not readily controllable when a constant temperature gas is used.

It is therefore desirable to provide a means for heating, in a controlled manner, each of a plurality of TL elements of the same or of different thicknesses mounted in a single card insert. With controlled heating of each TL element, their temperatures can be changed at preselected rates for detection of glow curves and for annealing any "remembered" exposure. In order to obtain long life of the TL elements, it is desired that the heating means avoid direct mechanical contact with the elements and that thermal glow of the heating means be eliminated or avoided.

SUMMARY OF THE INVENTION

TLD card readers according to the invention are free of most of the disadvantages associated with known TLD card readers. The novel readers have a number of advantages and benefits including efficient heating of TL elements, regardless of the different thicknesses of TL elements in a single card, flexible and directly programmable control of temperature as a function of time of a TL element being read, elimination of the need for moving parts in the heating assembly and a reduced background infrared emission occurring only during part of the TL element reading process. The novel non-contact readers provide accurate, flexible and reproducible heating control and dosimetry results independent of TL element thickness.

According to one embodiment of the invention, a TLD reader comprises a light detector, such as a photomultiplier, for detecting light emitted by a heated TL element and a heater for heating the TL element. The heater includes a conduit for receiving a gas at its inlet end from a gas source and transmitting a flow of the gas to an outlet end where it is discharged against the registered TL element. The conduit is heated in order to transfer thermal energy to the gas flowing through it.

Further in accordance with the invention, the conduit is electrically conducting and an electrical current is conducted through it in order to heat the conduit and the gas passing through it. The outlet end of the conduit is positioned, with the aid of a support fixture, opposite a registered TL element.

In a further aspect of the invention, a temperature sensing means, such as a thermocouple, is disposed proximate the outlet end of the conduit for sensing the temperature of the gas being discharged against a TL element. The thermocouple supplies a temperature signal to a control for the power supply that produces the electrical current flowing through the conduit. The control compares the temperature of the gas being discharged to a prescribed temperature as a function of time relationship and responds by adjusting the current flow to compensate for any deviations from the relationship.

A TLD card reader according to the invention can rapidly alter the temperature of a TL element as desired. This useful aspect is achieved through the low thermal mass of heater embodiments according to the invention. To achieve this end, it is preferred that the conduit have a wall no more than about 10 mils (0.25 mm) in thickness and most preferably about 2.5 mils (0.064 mm) in thickness. The conduit is preferably a corrosion resistant material such as stainless steel or monel metal alloy for long life without contamination of the reader.

A TLD reader according to the invention may include more than one heater in order to heat TL elements in card inserts carrying two or more TL elements.

The invention comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a plan view of a TLD card insert embodiment containing four TL elements;

FIG. 2 is a sectional view of the card insert embodiment of FIG. 1 taken along line 2—2 thereof;

FIG. 3 is a plan view, partially broken away, of a holder containing a TLD insert card carrying up to four TL elements;

DETAILED DECRIPTION

Figure 4:
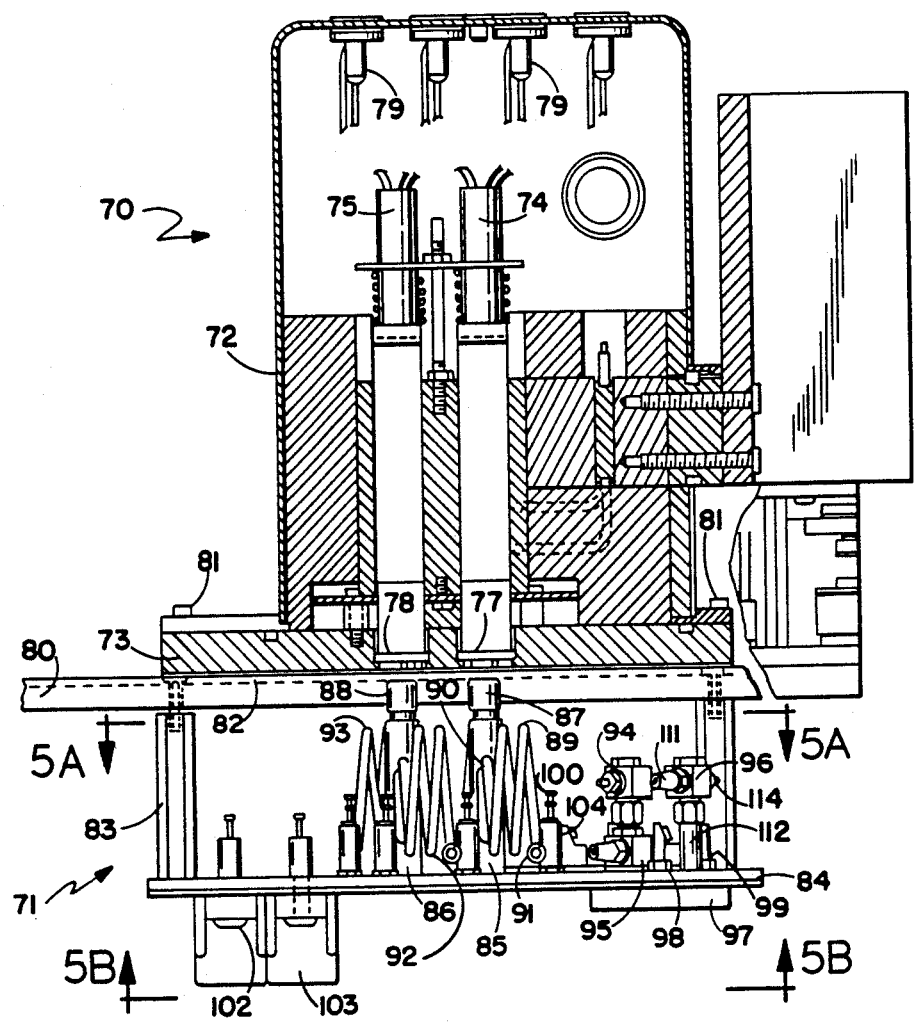
FIG. 4 is a part elevational, part sectional view of a TLD card reader according to an embodiment of the invention.

To facilitate a description and understanding of the invention disclosed here, an exemplary TLD card and holder are first described. The exemplary TLD card is shown in FIGS. 1 and 2, and the exemplary card holder is shown in FIG. 3.

In FIGS. 1 and 2, the exemplary TLD card, indicated generally at 30, includes a thin substrate 31 of rectangular shape except for the provision of a beveled orientation identification corner 32. Substrate 31 consists of two aluminum plates 33 and 34 that are secured together by rivets 35. Plates 33 and 34 have aligned holes forming four windows 36a-d that are arranged in a rectangular pattern at respective quadrants defined by major and minor axes of the substrate. Sandwiched between plates 33 and 34 are two sheets 37 and 38 of transparent heat resistant material such as transparent polytetrafluoroethylene material that encapsulates TL elements 39a-d at respective windows 36a-d. The TLD card also carries a machine readable code 40 extending along the minor axis of the card between the furthest spaced pairs of the windows.

The thermoluminescent materials of the TL elements 39a-d may be selected to suit a particular application such as detection of one or more different types of radiation. The number of TL elements may be varied for any given application and filters may be provided in a known manner. If only two TL elements are required, typically they would be located on one side of the major or long axis of the TLD card and, as is known, a machine readable code having a BCD format may be provided on the other side of the card's long axis as an alternative to the illustrated bar code format.

In FIG. 3, the exemplary holder, indicated generally at 45, includes a rectangular housing 46 having a notched orientation identification corner 47. Housing 46 includes top and bottom halves that are plastic or a plastic-like mateiral. The halves are joined along their side edges and form therebetween a slot having a width and height slightly greater than the width and thickness of the TLD card. The slot is open at both ends of housing 46 for insertion or removal of the TLD card at either end of the housing.

An exemplary TLD card reader that automatically feeds TLD card inserts or that automatically first extracts card inserts from holders and automatically feeds those inserts into the reader is described in U.S. patent application Ser. No. 721,334 filed Apr. 9, 1985, now U.S. Pat. No. 4,727,253. The disclosure of that patent application is incorporated herein by reference.

It is important to withdraw a TLD card insert from its holder before the insert is heated so that the TL element can be controllably heated and the relatively weak emitted light of the glow curve can be detected. Typically, light emissions from a heated TL element are detected by a photomultiplier which is an extremely sensitive detector of light. In order to minimize loss of any light emitted by a heated TL element and to avoid detecting light emitted by a different TL element mounted in the same card insert, the light receiving face of the photomultiplier is disposed very closely to one side of a TL element.

Ordinarily, the source of heat for the TL element is disposed on the side of the TL element opposite the photomultiplier tube. TLD card readers capable of analyzing inserts containing several TL elements may include a cluster of photomultiplier tubes and heating sources mutually spaced for alignement with TL elements in a card insert.

A card reader, such as that disclosed in U.S. patent application Ser. No. 721,334, includes a mechanism for advancing a TLD card insert from a source of such inserts along a path passing between the oppositely disposed photomultiplier(s) and heat source(s) to a read station. The mechanism includes a means for positioning a card insert between the light detector(s) and heat source(s) in the read station so that each TL element is disposed in registration with an opposed light detector and heat source. Typically, the card reader also includes a mechanism for removing an insert, after production of the glow curve or curves, from the read station.

In FIG. 4, a portion of a read station of a card reader according to an embodiment of the invention is shown in a sectional view. The upper part of the drawing figure includes a light detecting assembly 70 for detecting light emitted by one or more heated TL elements. Multiple TL elements in a single card reader insert can be heated simultaneously or sequentially. The lower part of FIG. 4 shows a TL element heating assembly 71 for heating one or more TL elements in a card insert to emit light and to anneal the elements.

Light detecting assembly 70 includes an opaque housing 72 mounted on a base 73 so that extraneous light cannot enter the assembly. Two conventional photomultiplier tubes 74 and 75 are shown mounted within the housing with their light detecting surfaces 77 and 78, respectively, directed downwardly in FIG. 3. Those surfaces 77 and 78 are disposed near, but slightly recessed from, the bottom surface of base 73 opposite housing 72. Photomultiplier tubes 74 and 75, as well as two additional photomultiplier tubes disposed behind them and thus hidden from view in FIG. 3, are respectively connected to a plurality of electrical feedthroughs 79 at the top of housing 72 for making electrical connections to the photomultiplier tubes. The embodiment of the reader partially shown in FIG. 3 is configured to produce glow curves for card inserts containing up to four TL elements. Obviously, by the relocation, addition or subtraction of photomultiplier tubes within housing 72, other types of card inserts or TL element configurations can be acommodated. The photomultiplier tubes are disposed within housing 72 so that a light detecting surface of each can be placed in registration with a TL element of a card insert carrying one or more TL elements.

Base 73 is mounted on a support 80 of the card reader by means of fasteners such as screws 81 that pass through base 80. Base 80 includes a channel or track 82 adjacent the bottom surface of base 73 through which a TLD card insert can be advanced for registration of its TL elements with light detecting surfaces 77 and 78 of the photomultiplier tubes. Extraneous light is excluded from reaching light detecting surfaces 77 and 78 through channel 82.

Fasteners 81 penetrate base 73 and support 80 to engage corner posts 83 of heater assembly 71. Corner posts 83 engage a support plate 84 and a cover (not shown) for heater assembly 71 that prevents extraneous light from reaching the photomultipliers through the heater assembly. Heater assembly 71 includes two heater nozzle fixtures 85 and 86 that are mounted on support 84. Nozzle supports 85 and 86 include ends 87 and 88, respectively, opposite the ends of the supports mounted on support 84. Supports 85 and 86 are arranged in their mounting so that ends 87 and 88 are disposed opposite light detecting surfaces 77 and 78 of photomultipliers 74 and 75, respectively. As with the photomultipliers, two additional nozzle supports are mounted behind supports 85 and 86 so that a TLD card insert containing four TL elements can be processed by the card reader of which FIG. 4 is a part. As discussed below, particularly in connection with FIGS. 5A and 6, the surfaces of ends 87 and 88 that are opposed to light detecting surfaces 77 and 78 are open so that a heated gas may flow out of the supports against one or more TL elements mounted in a card insert disposed within channel 82.

A gas is supplied through a tube or conduit 89 for exiting through the open end of nozzle support 85. Conduit 89 is preferably coiled for compactness. Conduit 89 enters support 85 through an aperture 90 disposed in the side of support 85. Conduit 89 has an inlet end 91 through which a gas may be introduced. The outlet end of conduit 89 is not visible in FIG. 4 but is received within support 85. A similar conduit 92 enters a like aperture in support 86. A third coiled conduit 93 disposed behind nozzle support 86 can be partially seen in FIG. 4. A fourth conduit (visible in FIG. 5A) may be disposed behind support 85.

Figures 5A, 5B:
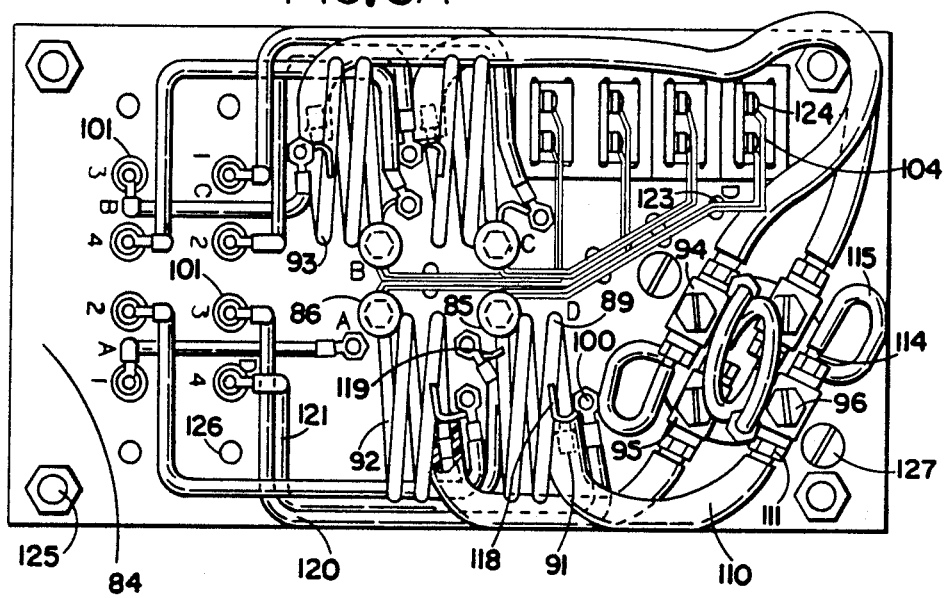
FIGS. 5A and 5B are plan and bottom views, respectively, of an assembly for heating a gas according to an embodiment of the invention, looking generally in the direction of arrows 5A—5A and 5B—5B of FIG. 4, respectively.

A gas may be supplied to each of conduits 89, 92 and 93 via hoses from one of fittings 94, 95 or 96. For clarity of illustration, certain electrical wires and fluid flow hoses are omitted from the illustration of FIG. 4, although they are shown in FIG. 5A. Each of these fittings (and, in a preferred embodiment, an additional fitting not visible in FIG. 4) may be supplied with a gas through an eight-port connector 97 which is mounted on support 84. Each of fittings 94, 95 and 96 includes two outlets, one for supplying gas to one of the conduits and one for supplying gas through another fitting, such as fittings 98 and 99 that are visible in FIG. 4, that are in communication with one of the ports of connector 97. As explained below, these additional ports in fittings 94, 95 and 96 permit monitoring of the pressure of the gas supplied to conduits 89, 92 and 93. A number of electrical binding posts 100 are mounted on support 84 to facilitate electrical connections to the conduits as explained in connection with Figs. 5A and 8. Electrical terminals 101 include binding posts and feedthroughs in electrical communication with screws 102 on barrier strips 103 so that electrical communication between the conduits and a power supply external to assembly 71 can be established as hereinafter described. Terminal blocks 104 include screws for making electrical connections to thermocouples as is hereinafter described.

Turning to FIGS. 5A and 5B, plan and bottom views of heater assembly 71 are shown. Like elements in FIGS. 4, 5A and 5B are given the same reference numerals. As is apparent from a comparison of those figures to each other, the embodiment of the invention illustrated may be used with TLD card inserts containing as many as four TL elements. Obviously, card inserts with fewer elements can be used with the embodiment of the invention that is illustrated and additional heaters and light detectors can be added to accommodate an insert card containing a larger number of TL elements. As further discussed below, each heater and light detector pair in an embodiment of the invention operates separately and independently from the other pairs. Four identical embodiments of the heating means are shown in FIG. 5A and are labeled A, B, C, and D. For simplicity in explaining the illustrating embodiment of the invention, only the embodiment labeled D is described below in detail. Embodiments A, B and C would be identically described.

Heating means embodiment D includes coiled conduit 89 having an outlet end disposed in nozzle support 85. The inlet end includes a fitting 91 having a flared end acting as a barb to retain one end of a flexible hose 110 that has been pushed onto fitting 91. The opposite end of hose 110 has been placed on a tubular stem 111 (seen in FIG. 4) that projects from fitting 96. Fitting 96 may receive gas through its supporting pipe 112 (visible in FIG. 4) which is in communication with a port 113 in the eight-ported connector 97. A second stem 114, in communication with stem 111 but of a smaller diameter, extends from fitting 96. A flexible hose 115 slipped over stem 114 at one end is slipped over fitting 99 (visible in FIG. 4) to establish fluid communication with a port 116 in connector 97. These connections provide a gas flow path from inlet port 113 of connector 97, through fitting 96, through hose 110, into conduit 89, through fitting 91 and out the open end of nozzle support 85. As explained below, no significant amount of gas flows through hose 115 since the fluid line is used as a pressure monitor.

Conduit 89 is formed into a helical coil including about two full turns. Conduit 89 is electrically conducting and preferably metallic. Near its inlet end, but spaced from inlet fixture 91, a wire 118 is mechanically and electrically joined to coil 89. The other end of wire 118 is in electrical and mechanical contact with one of binding posts 100. As will be described in more detail with respect to FIG. 6B, a second wire 119 is mechanically and electrically joined to conduit 89 near, but spaced from, its outlet end within nozzle support 85. The opposite end of wire 119 is in mechanical and electrical contact with a second binding post 100. An insulated wire 120 connects the first binding post 100 to a first terminal 101 that is electrically connected to a screw 102 in a barrier strip 103 on the outside of support plate 84. Likewise, an insulated wire 121 connects the second binding post 100 to a second terminal 101 for providing an electrical connection point on the outside of support 84 of assembly 71. In FIG. 5A, the two terminals just described are also designated as D3 and D4. When a voltage is applied across these two terminals, a current flows through the part of conduit 89 that lies intermediate its connections to wires 118 and 119. The conduit is heated as a result of this current flow and that thermal energy is transferred to gas flowing through the conduit.

In order to monitor the temperature of gas being discharged from the outlet end of conduit 89, as described below with respect to FIG. 6B, the junction of a thermocouple is substantially centrally disposed at the open end of nozzle support 85. The thermocouple leads 123 are connected to screw terminals 124 of a connector 104. As best seen in FIG. 5B, connector 104 passes through support 84. The portion of the connector on the outside of support 84 is a conventional thermocouple connector that mates with a complementary connector.

In addition to the elements already described for FIGS. 5A and 5B, various fasteners are shown for mounting the items already described. Four fasteners 125 proximate the corners of support 84 join the cover to posts 83. Four fasteners 126 hold barrier strips 103 onto support plate 84. Fasteners 127 secure the eight-port fluid connector to support 84. The nozzle supports are held in position by screws 128 which pass through support 84. Binding posts 100 are held in place by screws 129 that also pass through support 84. In the case of some of these fasteners, only their locations are shown in FIGS. 5A or 5B, but the fasteners are conventional ones, such as screws and nuts and bolts.

Figures 6A, 6B:
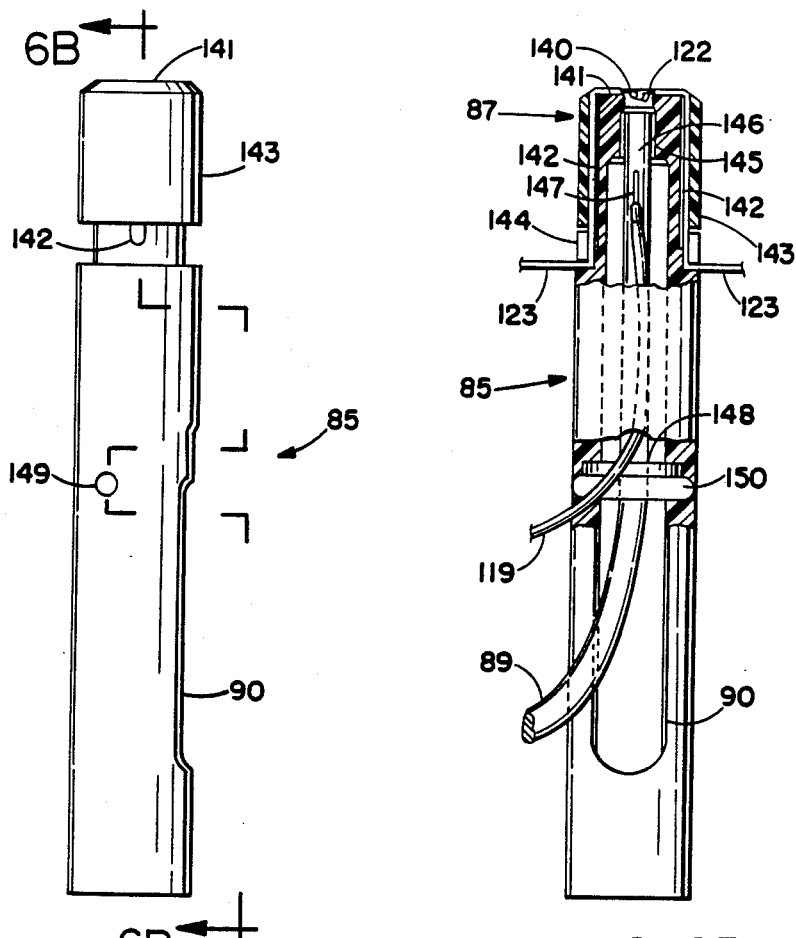
FIGS. 6A and 6B are, respectively, a side view and a sectional front view, partly in section, of a nozzle mounting fixture according to an embodiment of the invention, FIG. 6B also showing other elements associated with a nozzle support according to an embodiment of the invention.

In FIG. 6A a nozzle support 85 is shown in side view. In FIG. 6B, a sectional front view of nozzle support 85 is shown. FIG. 6B includes a thermocouple 122 and the outlet end of conduit 89 installed in the nozzle support. Like elements are given the same reference numerals in each drawing. Nozzle support 85 includes outlet end 87. As shown in FIG. 6B, outlet end 87 includes an opening 140 through which gas flowing through conduit 89 is discharged. A transverse groove 141 is disposed on the surface of nozzle support 85 containing opening 140. The groove is dimensioned to receive wires 123 of thermocouple 122 so that its junction can be disposed substantially centrally in opening 140 to monitor the temperature of gas flowing through that opening.

Groove 141 at its distal ends is in communication with two longitudinal channels 142 disposed on outlet end 87 of support 85. Channels 142 are preferably disposed diametrically opposite each other. As shown in FIG. 6B, thermocouple leads 123 are disposed in grooves 142. Support 85 may be unitary. In that case, grooves 142 may be formed by drilling through the top surface of the support. Alternatively, the support may include a separate cap 143 that makes a sliding fit with the body of support 85 may be seated over thermocouple leads 123 to hold them in place. A band 144, which may be a plastic cable tie, is preferably placed around the nozzle support 85 where leads 123 emerge from grooves 142 to restrain the leads to an appropriate dress within assembly 71.

Discharge end 87 includes a longitudinal bore 145 for receiving the outlet end 146 of conduit 89. Preferably, the tip of outlet end 146 is outwardly flared slightly to engage a reduced diameter portion of bore 145 near opening 140. Spaced from, but near outlet end 146 of conduit 89, an end 147 of wire 119 is mechanically and electrially joined to conduit 89. The main body of nozzle support 89 includes keyhole shaped opening 90 for insertion of outlet end 146 of conduit 89. A latch holds outlet end 146 in the appropriate position within support 85. The latch comprises a washer 148 that has been mechanically joined to the outside surface of conduit 89 at an appropriate distance from the outlet end. The body of support 85 includes a transverse hole 149 for receiving a pin 150. Pin 150, when inserted in hole 149, engages washer 148 on the side opposite opening 140 to prevent withdrawal of the conduit from support 85 and to hold discharge end 146 in an appropriate position within support 85.

Support 85 may be hollow throughout its entire length and its inside surface at its bottom end, i.e. opposite top end 87, may be internally threaded for receiving a mounting screw that passes through support plate 84 to engage support 85. As discussed below, support 85 is preferably constructed of a plastic material and a self-tapping fastener might be used in lieu of cutting internal threads in the support. The mechanical contact between conduit 89 and support 85 is limited to the flared tip of outlet end 89 and the latch washer and pin. This limited area contact minimizes thermal interaction of the conduit and support. This is, the support adds little thermal mass to the heater. Preferably, the thermal mass of the support and conduit assembly is substantially less than that of a gas flowing through the conduit so that heating and cooling of the flowing gas is not delayed by the heating and cooling of the conduit and/or support.

The elements of heating assembly 71 as described are either conventionally available or readily fabricated from conventional materials. Conduit 89 should have a relatively low thermal mass and a high degree of corrosion resistance. Preferably the tubing is made of stainless steel, such as 304 stainless steel, or is made of monel metal alloy. In order that the tubing have a low thermal mass, it is desirable that the tubing wall be relatively thin, preferably less than 10 mils (0.25 mm) and preferably thinner than 5 mils (0.13 mm). Most preferably, the wall thickness is about 2.5 mils (0.06 mm). A typical outside diameter for useful tubing is about 95 mils (2.4 mm). Tubing of the sizes just described is available as hypodermic tubing. Washer 149 may be a conventionally available stainless steel washer that is brazed or silver soldered to conduit 89 at the appropriate location to form parts of the latch holding the outlet end of the conduit in the nozzle support. Fitting 91 can be a section of stainless steel hypodermic tubing having an inside diameter just large enough to accept the outside diameter of conduit 89. That short length of tubing is flared at one end and the other end is slipped onto an end of conduit 89 and silver soldered or brazed to form the fixture 91. Wires 118 and 119 may be conventional copper wires that are silver soldered or brazed to conduit 89 near its inlet and outlet ends.

In order to heat conduit 89 for heating a gas passing through the conduit, an electric current is passed through the conduit between wires 118 and 119. In the course of heating and annealing a conventional TL element, it is necessary to heat the gas flowing through the conduit to temperatures as high as about 300° C. In spite of the relatively high temperature achieved, by attaching wire 118 at a distance from the inlet end of conduit 89, the temperature of the inlet end of conduit 89 remains relatively cool. Therefore, hoses 110 and 115 may be ordinary thermoplastic tubing. The outlet end of conduit 89 experiences a somewhat higher maximum temperature. Nonetheless, the maximum temperature is low enough that the nozzle supports can be made from a high temperature plastic material, such as that sold by DuPont under the trademark VESPEL SPI. Conduit 89 must be long enough to heat a gas flowing through it to the maximum temperature desired. A conduit length of about 9 inches (0.23 m) is satisfactory to raise an adequate flow of nitrogen to 300° C. In order to house that length in a reasonable volume, particularly in a four TL element reader, conduit 89 is formed into a helix.

By choosing the conduit materials as described, a low thermal mass heating apparatus according to the invention can be constructed. A low thermal mass (i.e. the product of the heater element mass and its specific heat) means that the heater will have a relatively short thermal time constant. That is, the temperature of the gas flowing through the conduit can be changed relatively quickly without a significant delay while the conduit heats or cools. Unlike known TL heaters, the apparatus does not limit the time response of heating and cooling; in the invention, only the thermal mass of the flowing gas and of the TL elements limits the thermal response time. The appropriate gas flow rate that is necessary to heat a TL element through a desired time and temperature cycle may be determined experimentally. Therefore, nearly any thermal time constant for the heating rate response, subject to the TL element response time, can be achieved with the novel apparatus. It is unlikely that this time constant would ever desirably exceed ten seconds. In the invention time constants much shorter than ten seconds and preferably on the order of a fraction of a second may be attained.

Figure 7:
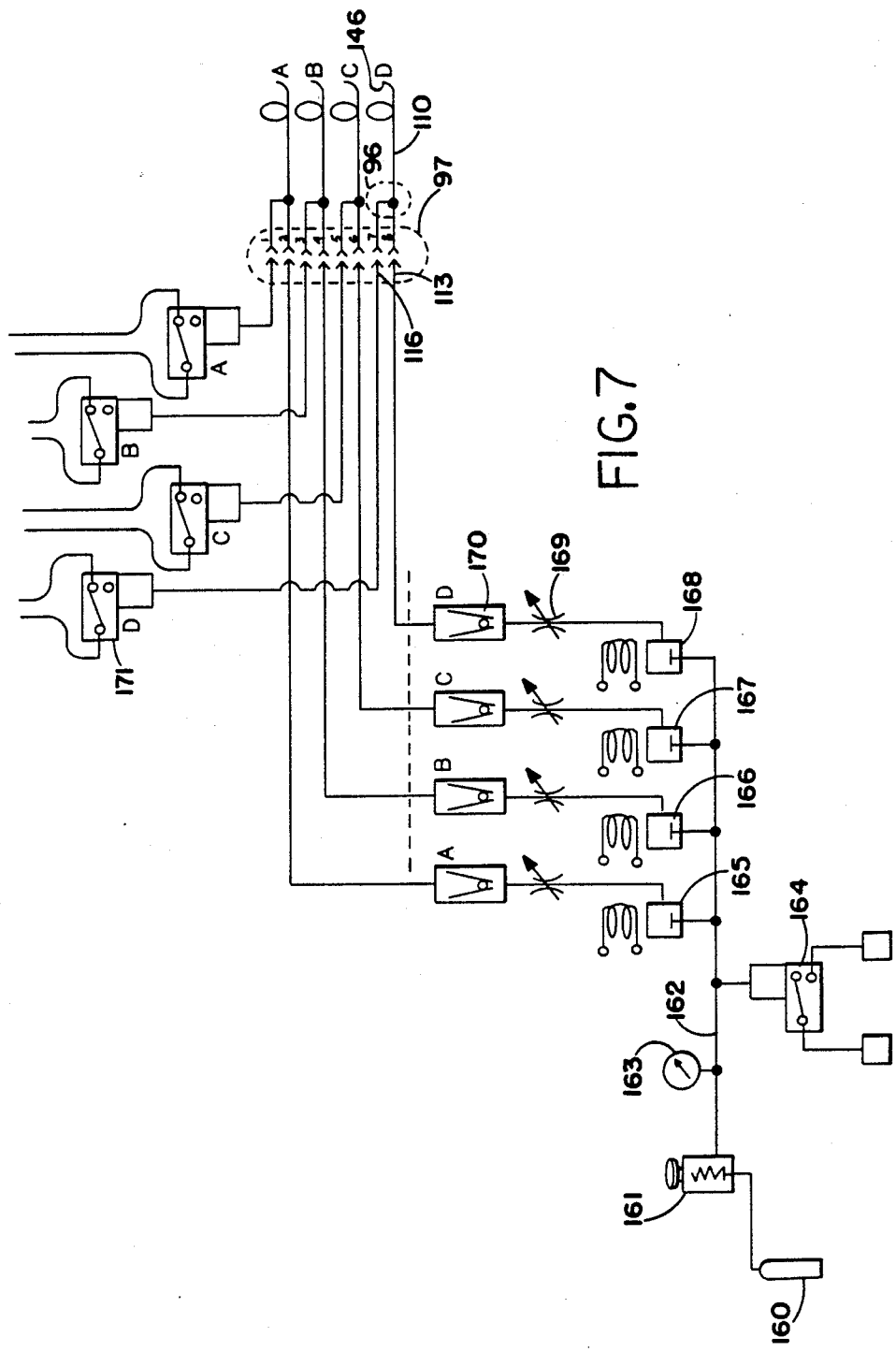
FIG. 7 is a schematic diagram of a gas heating assembly according to an embodiment of the invention.

The fluid flow apparatus of a TLD card reader of which heater assembly 71 may be a part is shown in FIG. 7. A source of a gas 160 such as a cylinder of compressed nitrogen is applied to a pressure regulator 161. The reduced pressure gas is supplied from regulator 161 via a pipe 162 to a number of elements. It is supplied to a gauge 163 for measuring the regulated pressure. It is also supplied to a pressure actuated electrical switch 164. Switch 164, when actuated, enables a card reader for measurement of one or more glow curves. Absent sufficient gas pressure in line 162, switch 164 will not be actuated so that the card reader will not begin heating TL elements. Gas pressure actuated switches are conventionally available.

Conventionally available solenoid valves 165, 166, 167, 168 are cnnected to line 162 for selectively applying gas pressure to one or more of the conduits in a four-conduit embodiment of a heater assembly. These valves are opened when an appropriate electrical current flows through their solenoid coils. Valves 165, 166, 167 and 168 are respectively connected to units A, B, C and D such as were designated in FIG. 5A. Consistent with the description of that figure, only unit D of FIG. 7 is described since all of the units A, B, C and D are identical.

Gas fow from valve 168 passes through a regulating valve 169 to a flow meter 170. The gas flow from flow meter 170 passes through port 113 of eight port connector 97. From that point, gas flows through hose 110 into conduit 89 and is discharged at outlet end 146. In fitting 96, the gas pressure is monitored through hose 115 which conducts gas through port 116 of connector 97. From port 116, a gas line transmits the gas to a gas pressure actuated electric switch 171. Switch 171 enables or disables an electric current source, described in connection with FIG. 8, that supplies an electric current to wires 118 and 119 to heat conduit 89. In the absence of sufficient gas pressure, switch 171 is not actuated so that no current can flow through conduit 89. Switch 171 provides a measure of safety by preventing overheating of conduit 81 should a current continue to flow through it in the absence of a sufficient gas flow. As is apparent from FIG. 7, if a TLD card insert contains fewer than four TL elements, one or more of units A-D may be idled by allowing the appropriate solenoid valves 165-168 to remain closed.

In a TLD card insert reader according to the invention, such as the portion shown in FIG. 4, there is a small gap, of perhaps 0.062 inch (1.6 mm), between a TL element in a card insert and the outlet end of the conduit.

In order to produce the desired glow curves, it is necessary to raise the temperature of the TL element over time in a prescribed temperature and time relationship. The TL element starts at ambient temperature. In the beginning of the heating cycle, the temperature is increased rapidly in a generally linear relationship over time until it reaches a maximum of about 300° C. That maximum is held for a period of time, after which the TL element is permitted to cool to a temperature above ambient.

Figure 8:
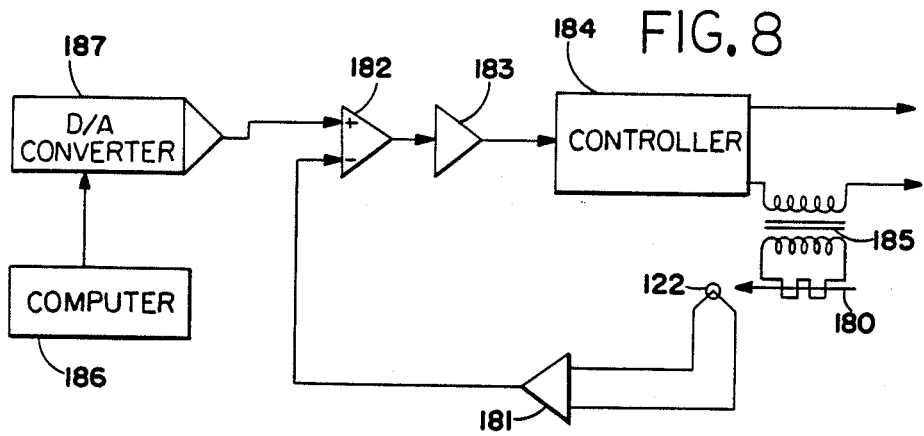
FIG. 8 is a schematic diagram of a controller for controlling the temperature of a gas being heated, according to an embodiment of the invention.

The desired temperature responses over time can be achieved with heater assembly 71 used in conjunction with the control system shown schematically in FIG. 8. There, a gas flow through a conduit is indicated by arrow 180. The gas flows over thermocouple 122 which is electrically connected to a thermocouple amplifier 181 that increases the amplitude of the signal indicating the temperature of the gas flowing over the thermocouple. The output signal from amplifier 181 is applied to a negative sense terminal of a differential amplifier 182. The positive sense input terminal of differential amplifier 182 receives a signal that varies over time in the same way as the desired temperature versus time characteristic.

When the measured temperature, i.e. the signal from amplifier 181, is different from that indicated as desired by the signal at the positive sense input terminal of differential amplifier 182, amplifier 182 generates an error signal. The error signal indicates by its polarity and amplitude the direction and amount of variation of the temperature from the desired value. The error signal is applied to an amplifier 183 which increases the amplitude of the error signal. The output signal from amplifier 183 is applied to a controller 184 that is powered from a conventional power source such as 115 volts AC. Controller 184 is connected to the power source through the primary winding of a transformer 185. The secondary winding of transformer 185 is connected to a conduit, such as conduit 89, through wires 118 and 119.

For convenience in recalling a desired temperature versus time characteristic and for changing that characteristic from time to time, it is preferred that a computer, such as a microprocessor 186, be used to store various such charcteristics. A selected one of the characteristics, stored in digital form, is transmitted to a digital-to-analog converter 187 to generate an appropriate analog signal that is applied to the positive sense input terminal of differential amplifier 182. By giving appropriate instructions to computer 186, the current flow through conduit 89 over time is controlled and, as a direct result, the temperature of the gas flowing through the conduit and being discharged against a TL element is controlled to produce a desired glow curve. The apparatus of FIGS. 7 and 8 are preferably used together so that, for example, switch 171 will enable controller 184 to function if sufficient gas pressure is present at conduit 89. Likewise, if there is insufficient pressure, controller 184 will be disabled and overheating of the conduit will be avoided.

The invention provides direct, programmable and reliable control of the temperature versus time profile of a TL element for retrieving dosimetry information. There is no direct mechanical contact between any part of the heating means and the TL element being heated that might damage that element. The close control of the temperature of the gas being discharged against the element prevents thermal damage to the element mounting from overheating. The novel heater is free of any moving parts that might wear and malfunction.

The invention has been described with respect to certain preferred embodiments. Various modifications and additions within the spirit of the invention will occur to those of skill in the art. Accordingly, the scope of the invention is limited solely by the following claims.

We claim:

1. A TLD card reader comprising:
   at least one means for detecting light emitted by a heated TL element; and
   means for heating a TL element, said means for heating comprising conduit means for channeling and heating a flow of a gas, said conduit means having an outlet end for discharging said gas against said TL element, and means for controllably heating said conduit means to heat said gas flowing through said conduit means,
   said conduit means being electrically conducting and said means for controllably heating including means operatively connected to said conduit means for controllably passing an electrical current through said conduit means to heat said conduit means, thereby controllably to heat said gas flowing through said conduit means.

2. The TLD card reader of claim 1 including temperature sensing means for measuring the temperature of a gas being discharged from said outlet end.

3. The TLD card reader of claim 2 including control means, operatively connected to said temperature sensing means and said means for controllably passing a current, for heating a gas flowing through said conduit means to a temperature varying with time according to a prescribed temperature versus time characteristic.

4. The TLD card reader of claim 3 wherein said control means comprises means for generating an electrical signal varying with time according to said prescribed characteristic, means for comparing the temperature indicated by said temperature sensing means to said electrical signal to produce a difference signal and means for controlling said means for passing a current in response to said difference signal, thereby to vary the temperature of said discharging gas with time according to said prescribed characteristic.

5. The TLD card reader of claim 4 wherein said means for generating comprises a programmable computer means for producing a digital signal having said prescribed characteristic.

6. The TLD card reader of claim 5 including means, operatively connected to said programmable computer means, for converting said digital signal into a corresponding analog signal for application to said means for comparing.

7. The TLD card reader of claim 2 including means for holding said TL element spaced from said outlet end, and wherein said sensing means is spaced with respect to said outlet end by a distance less than the spacing between said outlet end and TL element.

8. The TLD card reader of 1 wherein said conduit means has an inlet end opposite said outlet end and said means for passing an electrical current comprises a pair of electrical leads, one of said electrical leads mechanically and electrically contacting said conduit means
at a first location near said outlet end and the other of said electrical leads mechanically and electrically contacting said conduit means
at a second location spaced from said first location along said conduit means, and a controllable current source means, operatively connected to said leads, for controllably generating an electrical current.

9. The TLD card reader of claim 1 wherein said conduit means comprises a metal tube having a wall thickness of no more than about 0.25 mm.

10. The TLD card reader of claim 9 where said metal tube has a wall thickness no greater than about 0.064 mm.

11. The TLD card reader of claim 1 including means, operatively connected to said means for heating, for preventing heating of said conduit means when the pressure of gas within said conduit means falls below a predetermined threshold.

12. The TLD card reader of claim 1 including a tubular support for said conduit means, said tubular support having a side wall including aperture means for passing said conduit means into the interior of said tubular support from outside said tubular support, said conduit means having a portion thereof extending from said aperture means axially through said tubular support to an end wall of said support, said end wall including an opening aligned with said outlet end of said conduit means.

13. The TLD card reader of claim 12 wherein said portion of said conduit means has a major part thereof spaced from contact with said side wall of said tubular support.

14. The TLD card reader of claim 12 including temperature sensing means disposed proximate said outlet end for measuring the temperature of a gas being discharged from said outlet end, said sensing means including a sensing element, and means for securing said sensing means to said tubular support with said sensing element located at said opening in said end wall of said tubular support.

15. The TLD card reader of claim 14 wherein said means for securing includes a tubular sleeve telescoped over said tubular support.

16. A TLD card reader comprising:
a plurality of means for detecting light emitted by respective heated TL elements; and
means for heating each of a plurality of TL elements, said means for heating comprising a plurality of conduit means each associated with a respective one of said plurality of means for detecting for channeling a flow a gas to a respective one of said TL elements, each of said conduit means having an outlet end for discharging said gas against a respective TL element, and means for independently heating each of said conduit means to heat the gas flowing through each of said conduit means, thereby independently, controllably to heat each TL element, and said conduit means being heated by said means for independently heating over a portion thereof terminating in close proximity to said outlet end of said conduit means.

17. The TLD card reader of claim 16 wherein each of said conduit means is electrically conducting and said means for heating comprises means operatively connected to each of said conduit means for controllably passing an electrical current through said conduit means to heat gas flowing through said conduit means.

18. An assembly for heating a TL element comprising an electrically conducting conduit means for channeling and heating a flow of gas, said conduit means having an outlet end for discharging said gas against a TL element, and means operatively connected to said conduit means for controllably passing an electrical current through said conduit means to heat said conduit means, thereby controllably to heat said gas flowing through said conduit means for controllably heating a TL element.

19. The assembly of claim 18 including temperature sensing means disposed proximate said outlet end for measuring the temperature of a gas being discharged from said outlet end.

20. The assembly of claim 19 including control means, operatively connected to said temperature sensing means and said means for controllably passing a current, for heating a gas flowing through said conduit means to a temperature varying with time according to a prescribed temperature versus time characteristic.

21. The assembly of claim 20 wherein said control means comprises means for generating an electrical signal varying with time according to said prescribed characteristic, means for comparing the temperature indicated by said temperature sensing means to said electrical signal to produce a difference signal and means for controlling said means for passing a current in response to said difference signal, thereby to vary the temperature of said discharging gas with time according to said prescribed characteristic.

22. The assembly of claim 21 wherein said means for generating comprises a programmable computer means for producing a digital signal having said prescribed characteristic.

23. The assembly of claim 22 including means, operatively connected to said programmable computer means, for converting said digital signal into a corresponding analog signal for application to said means for comparing.

24. The assembly of claim 18 wherein said conduit means comprises a stainless steel tube having a wall thickness of no more than about 0.25 mm.

25. The assembly of claim 24 wherein said metal tube has a wall thickness no greater than about 0.064 mm.

26. The assembly of claim 18 including a tubular support for said conduit means, said tubular support having a side wall including aperture means for passing said conduit means into the interior of said tubular support from outside said tubular support, said conduit means having a portion thereof extending from said aperture means axially through said tubular support to an end wall of said support, said end wall including an opening aligned with said outlet end of said conduit means.

27. The assembly of claim 26 wherein said portion of said conduit means has a major part thereof spaced from contact with said side wall of said tubular support.

28. The assembly of claim 26 including temperature sensing means disposed proximate said outlet end for measuring the temperature of a gas being discharged from said outlet end, said sensing means including a sensing element, and means for securing said sensing means to said tubular support with said sensing element located at said opening in said end wall of said tubular support.

29. The assembly of claim 18 wherein said conduit means has an inlet end opposite said outlet end and said means for passing an electrical current comprises a pair of electrical leads, one of said electrical leads mechanically and electrically contacting said conduit means
- at a first location near said outlet end and the other of said electrical leads mechanically and electrically contacting said conduit means
- at a second location spaced from said first location along said conduit means, and a controllable current source means, operatively connected to said leads, for controllably generating an electrical current.

30. The assembly of claim 18 including means, operatively connected to said means for heating, for preventing heating of said conduit means when the pressure of gas within said conduit means falls below a predetermined threshold.

31. The assembly of claim 18 wherein said conduit means comprises a metal tube having a wall thickness of no more than about 0.25 mm.

32. A TLD card reader comprising:
- a plurality of means for detecting light emitted by heated TL elements; and
- means for heating each of a plurality of TL elements, said means for heating comprising a plurality of conduit means for channeling a flow of a gas, each of said conduit means having an outlet end for discharging said gas against a TL element, and means for independently heating each of said conduit means to heat the gas flowing through each of said conduit means, thereby independently, controllably to heat each TL element, and each of said conduit means being electrically conducting and said means for heating comprising means operatively connected to each of said conduit means for controllably passing an electrical current through said conduit means to heat said conduit means thereby controllably to heat said gas through said conduit means.

* * * * *